United States Patent Office 3,713,020
Patented Jan. 23, 1973

3,713,020
APPARATUS FOR DETECTING A SHORT CIRCUIT ACROSS A GAP BY COMPARING THE GAP VOLTAGE WITH A DELAYED PORTION THEREOF
Henning Kohler, Wermelskirchen, Germany, assignor to AEG-Elotherm G.m.b.H., Remscheid-Hasten, Germany
Filed Apr. 4, 1969, Ser. No. 813,577
Int. Cl. G01r 31/02; G08b 21/00
U.S. Cl. 324—51                                    5 Claims

ABSTRACT OF THE DISCLOSURE

A method and apparatus for detecting a short circuit across a gap by detecting the voltage across the gap and combining that voltage with a second voltage produced by delaying the gap voltage so that only a short circuit will produce a signal sufficient to indicate a short circuit condition. More particularly the invention is intended for use with apparatus for the electrochemical removal of material whereby a workpiece, usually connected as an anode, and a tool, usually connected as a cathode, form a gap which is continuously filled with a flowing electrolyte solution so that as direct current flows through the electrolyte and across the gap, material will be removed from the anode. Shunting devices such as thyristors are preferably connected in parallel across the gap so that when the combination of the gap voltage and a second voltage produced by delaying the gap voltage indicates a short circuit condition, these shunting devices can dissipate the energy resulting from the short circuit condition and prevent the overflow of current across the gap.

BRIEF DESCRIPTION OF THE PRIOR ART AND SUMMARY OF THE INVENTION

The invention relates to a method and apparatus for detecting the presence of a short circuit across a gap and more particularly for detecting a short circuit condition across a gap between two electrodes wherein an electrolyte solution flows continuously through the gap to facilitate electrochemical removal of material from one of the electrodes.

Electrolytic machining arrangements, whereby a workpiece and a tool are spaced apart to form a gap through which an electrolytic solution flows, have been known and successfully employed for many years. Usually, in such arrangements, the workpiece is connected conventionally as an anode, i.e. to the positive electrode of a direct current source, while the tool is connected as a cathode, to the negative terminal. The electrolyte solution flowing in the gap which forms the operating section between the workpiece and tool then carries a direct current, usually of high intensity, between the workpiece and the tool to cause removal of material at the anode. Frequently, this solution is simply a solution of common sodium chloride and water.

This electrolyte solution is normally constantly and cyclically circulated through the gap with the aid of a pump or similar device and is cooled and cleaned following or during each complete circulation. The material particles which are removed by the high intensity current flow from the anode dissolve in the electrolyte solution and when steel and iron are used as the workpiece and electrode such particles are predominantly in the form of $Fe_2O_3$. Any source of direct current may be used which is sufficient to supply the high intensity current requirements of the device, and conventionally a power transformer and a loadside rectifier are employed.

In such electrochemical removal finishing, it is usually desirable to maintain an even and progressive material removal as well as very narrow operating gap of a fixed size. Since the anode material is being constantly removed, it is thus necessary to adjust either the tool electrode or the workpiece constantly and move it toward the opposite member at a constant speed related to the rate of material removal from the workpiece to maintain the operating gap at a constant width. Not infrequently, however, during such electrochemical removal the rate of removal of the material may change, for example, because the fresh electrolyte solution is not being fed in sufficient quantities or a number of the smaller particles become stuck in the operating gap and accordingly if the tool is subsequently moved forward at the same speed, there is an extreme danger that a short circuit with resultant damage to the workpiece and tool will result unless the current supply is switched off immediately and current diverted away from the gap.

One way to accomplish such a current diversion is to mount current carrying elements, which can be switched from a high to a low resistance state quickly, across the gap. Thyristors have in past been used successfully as such elements. Then, as the short circuit occurs or shortly before it occurs, the thyristors are fired, that is electrically shifted from their high resistance to low resistance states, so that the most of the overload current which would otherwise flow across the operating gap instead flows through the elements and is dissipated harmlessly as heat. At the same time, the source of voltage can be either switched off or disconnected from the gap so that the current intensity across the gap will not be driven to a level which causes damage to the electrodes or produces an arc across the gap.

The amount of electrical energy which must be dissipated by the thyristors depends on the time interval which elapses between the time that the current through the gap begins to abruptly rise because of the short circuit condition and the time at which the energy supply is actually removed. The quicker the energy can be removed the less demand is made upon the electrical switches such as the thyristors and the less expensive are the devices which can be employed. Practically it is desirable that removal of the voltage source after the occurrence of a short circuit condition be carried out in approximately 100 microseconds or less.

A number of different attempts have been made in the past to solve the problem of detecting short circuits across such a removal gap. Since the current intensity across the gap normally increases suddenly and greatly upon the occurrence of a short circuit at the same time that the voltage collapses, one simple way to detect a short circuit condition is simply to measure that gap voltage or current and shut off the energy source supplying electricity to the gap whenever the amplitude of the gap current exceeds a given value or the amplitude of the gap voltage is less than a given value. Unfortunately, this method has not proved satisfactory since normally the gap current and voltage have a high degree of ripple in devices electrochemically removing material. Thus, if the cut-off value of current intensity or voltage amplitude is fixed just above the value at which the gap normally operates then it can be expected that many false indications will be given and the speed at which the removal job can be accomplished will be substantially reduced by the frequent detection of a short circuit in situations where no actual short circuit is in fact occurring. Further, if the amplitude of gap voltage or intensity of gap current is set well above the normal operating voltage and current then a great deal of time with possible damage to the electrodes will have already passed by the time that steps are taken to cut off the flow of further current. As a result, this approach has not been completely satisfactory for detecting short circuits. Other arrangements whereby both the under voltage and over current conditions have been detected and connected with each other via logical circuits and where the impedance of the operating section is used as the criteria of a short circuit have been similarly inadequate in responding only to real short circuits and to responding to such short circuits quickly enough to prevent damage to the system and permit the use of economical current dissipating devices.

Another response to this basic problem made use of the physical phenomenon that the ripple of current and voltage following a genuine short circuit, i.e. the number of its high frequency components, rises considerably and quickly. If such voltages are filtered out by means of conventional devices, then it can be assumed upon detection of a given level of these high frequency voltages and currents that a short circuit condition is present and the source of electrical energy should be removed from the circuit. Unfortunately, these same high frequency voltage and current components also appear in substantial numbers during other electrical processes including switching processes so that such a short circuit determination is still vunerable to frequent false alarms.

This invention sets forth a method and apparatus whereby a short circuit condition can be quickly and rapidly detected and the power source disconnected within practical time limits but which does not ordinarily respond to false alarms and swings in the current and amplitude not resulting from a genuine short circuit condition. This is accomplished by producing a control signal by combining the gap voltage with another electrical voltage signal produced by delaying the gap voltage. This control signal is then employed to fire or otherwise actuate the electronic devices shunted across the operating gap, such as thyristors, and at the same time to disconnect or turn off the energy source or otherwise interrupt current flow through the gap and thyristors. Moreover, it is preferred that this control signal will be produced in a differential amplifier and that the gap voltage will be applied to a first input of the amplifier while the gap voltage is applied to a differentiating circuit consisting of a diode, capacitor, fixed resistance and source of auxiliary voltage and then to a second input of the amplifier. A differential amplifier may be constructed of either discrete or integrated elements and an embodiment employing transistors as discrete elements in a differential amplifier is disclosed.

Other objects and purposes of the invention will become clear from the following detailed description of the drawings.

DETAILED DESCRIPTION OF THE DRAWINGS

Figure 1:
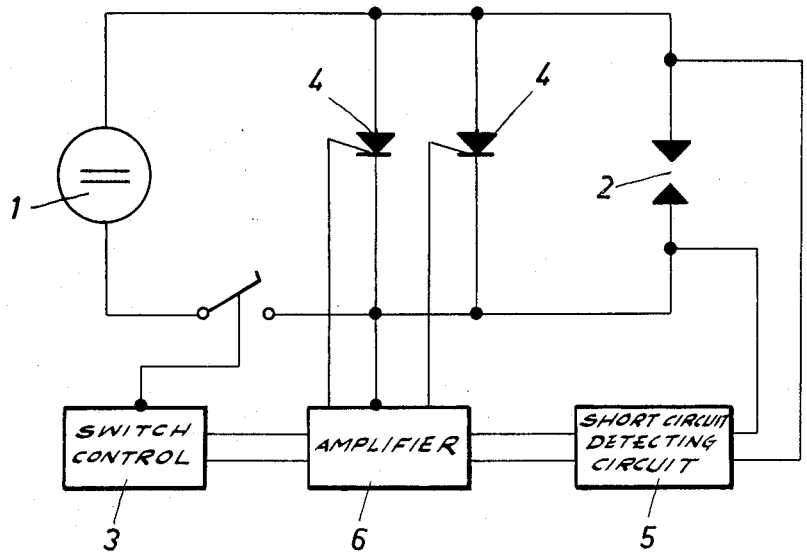
FIG. 1 shows a block diagram of an installation for electrochemical material removal.

Reference is now made to FIG. 1 in which an arrangement for detecting a short circuit condition across a gap 2 is disclosed. In this arrangement, a source of direct current 1, which can, as mentioned above, consist of a power transformer and rectifier, supplies the energy to the gap to cause the electrochemical material removal. An opening switch device 3, which may be a conventional relay or similar device, is provided in the electrical path between the source 1 and gap 2 so that the flow of electrical energy can be interrupted by opening the switch associated with device 3 to the position illustrated in FIG. 1.

A number of elements 4, of which two are shown in FIG. 1, and which preferably are thyristors, are connected in parallel across the operating gap 2 and upon occurrence of a short circuit condition in the operating gap are fired to provide an electrical shunt across the gap. These devices 4 normally have high resistance and are shifted to a low resistance condition, for example, by the application of a suitable voltage to a gate electrode.

Figure 2:
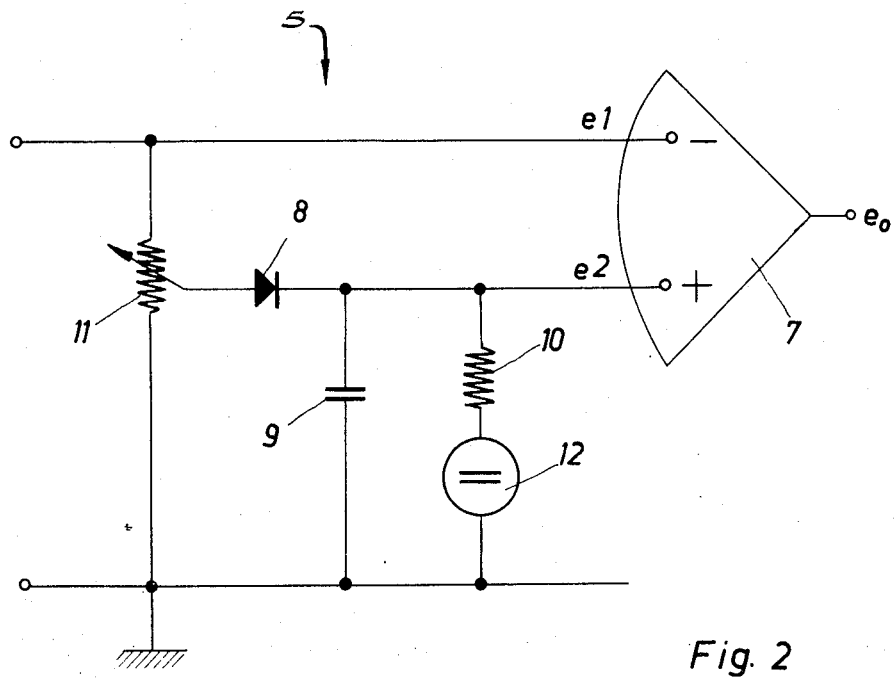
FIG. 2 shows a schematic diagram of the short circuit detecting apparatus of this invention.

The short circuit determining circuit 5, which is also disclosed in greater detail in FIG. 2, detects the voltage across the operating gap 2 and produces a control signal as discussed above which is amplified by an amplifier 6 which also serves to trigger the elements 4, and then passes the control signal to the switch 3 to cause interruption of the current through the gap 2 by the opening of the illustrated switch controlled by the circuit 3.

Reference is now made to FIG. 2 which shows one embodiment of a short circuit determining circuit 5. In this embodiment the voltage across the gap 2 is applied as one input to the differential amplifier 7 and as shown in FIG. 2 this input is labelled $e_1$ and is preferably connected to the negative terminal. Amplifier 7 is preferably an integrated circuit on a small appropriate chip. The other input to the positive terminal which is labelled $e_2$ in FIG. 2 is also derived from the voltage across the gap and in fact is that voltage delayed in time and reduced somewhat in amplitude.

The voltage across the gap 2 is applied to a voltage divider 11 of conventional type and passes through to a delaying circuit comprised of a capacitor connected in parallel with a serially connected resistor 10 and an auxiliary source of voltage 12 via diode 8. These elements— namely diode 8, capacitor 9, resistor 10 and auxiliary source of voltage 12—serve to delay the voltage produced across the gap slightly, and at the same time delay that voltage so that the output of the amplifier 7 is in fact the difference between the gap voltage and a second voltage which is the reduced delay of that gap voltage. The auxiliary source 12 connected in the delay circuit insures that the voltage at the input $e_2$ of the differential amplifier 7 cannot drop to 0 even if the input $e_1$ does or if the delay elements receive no signal voltage.

Figure 3A:
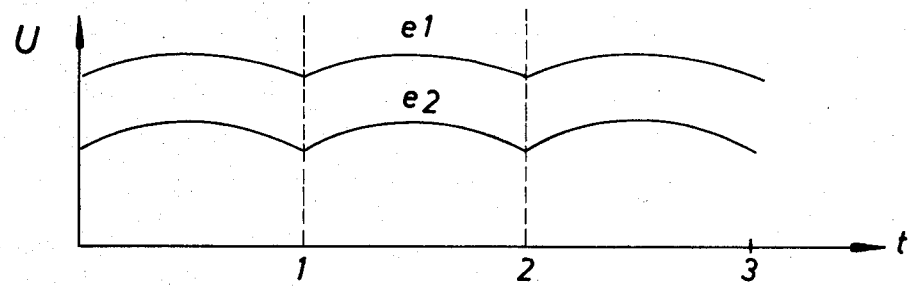
FIG. 3a shows the normal voltage at the input of the differential amplifier of FIG. 2.
Figure 3B:
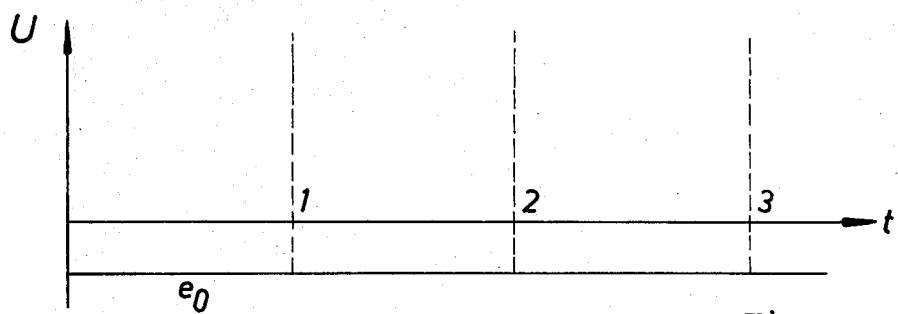
FIG. 3b shows the normal voltage at the output of the differential amplifier of FIG. 2.

FIG. 3a shows a typical plot of the voltage $e_1$ across the gap, and the reduced delay of that voltage $e_2$, during normal operation of the electrochemical material removal device when there is no short circuit in the operating gap 2. As can be observed, the voltage across the operating gap 2 normally has a considerable ripple which, however, changes relatively slowly so that the voltage $e_2$, which represents the voltage $e_1$ delaying and slightly reduced, follows voltage $e_1$ quite closely. Accordingly, the output $e_0$ of the differential amplifier 7 as shown in FIG. 3b is essentially flat and slightly negative.

Figure 4A:
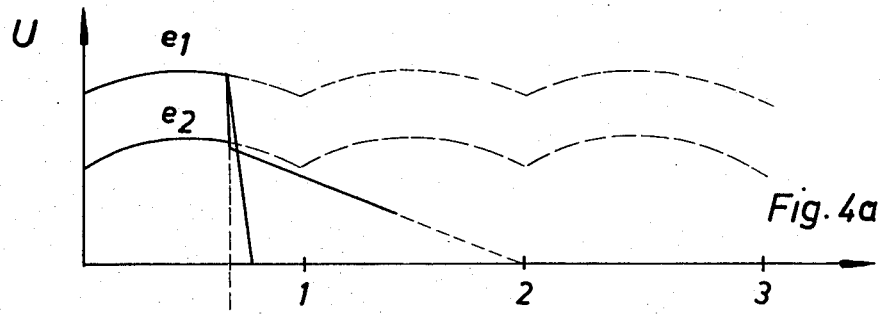
FIG. 4a shows the voltages at the input of the differential amplifier of FIG. 2 during a short circuit condition.
Figure 4B:
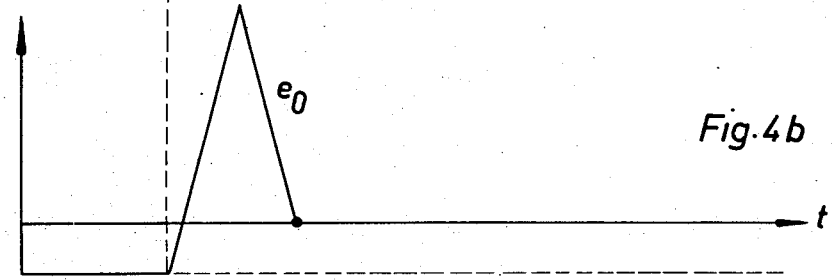
FIG. 4b shows the output of the differential amplifier of FIG. 2 during a short circuit condition.

In FIG. 4, the plot of the two input voltages $e_1$ and $e_2$ is shown over a period during which a short circuit condition has occurred in the operating gap. As can be seen, the input voltage $e_1$ collapses steeply after the short circuit occurs with a very high negative differential quotient of the voltage. The voltage $e_2$, on the other hand, drops at a considerably less rate of decline, since the rate of discharge of capacitor 9 limits the fall. The energy stored in the capacitor 9 upon occurrence of a short circuit then is discharged with a corresponding time constant via resistor 10 to the value of the voltage of the auxiliary source 12. As a result of this slower discharge of capacitor 9 as compared to the decline of voltage $e_1$ voltage $e_2$ will be greater than $e_1$ in a very short time as a result of which a positively directed impulse as can be seen in FIG. 4b, results at the output $e_0$ of the differential amplifier 7, and it is this impulse which is the signal which is passed to amplifier 6 and then device 3 and elements 4 to switch off power to the gap 2 by opening the switch controlled by device 3 and to fire the thyristors or other elements to divert the short circuit current surging through the gap 2. This particular arrangement has been found to be able to detect a genuine short circuit condition in approximately 5 microseconds and switch off the power through the gap 2 in approximately 100 microseconds.

Figure 5:
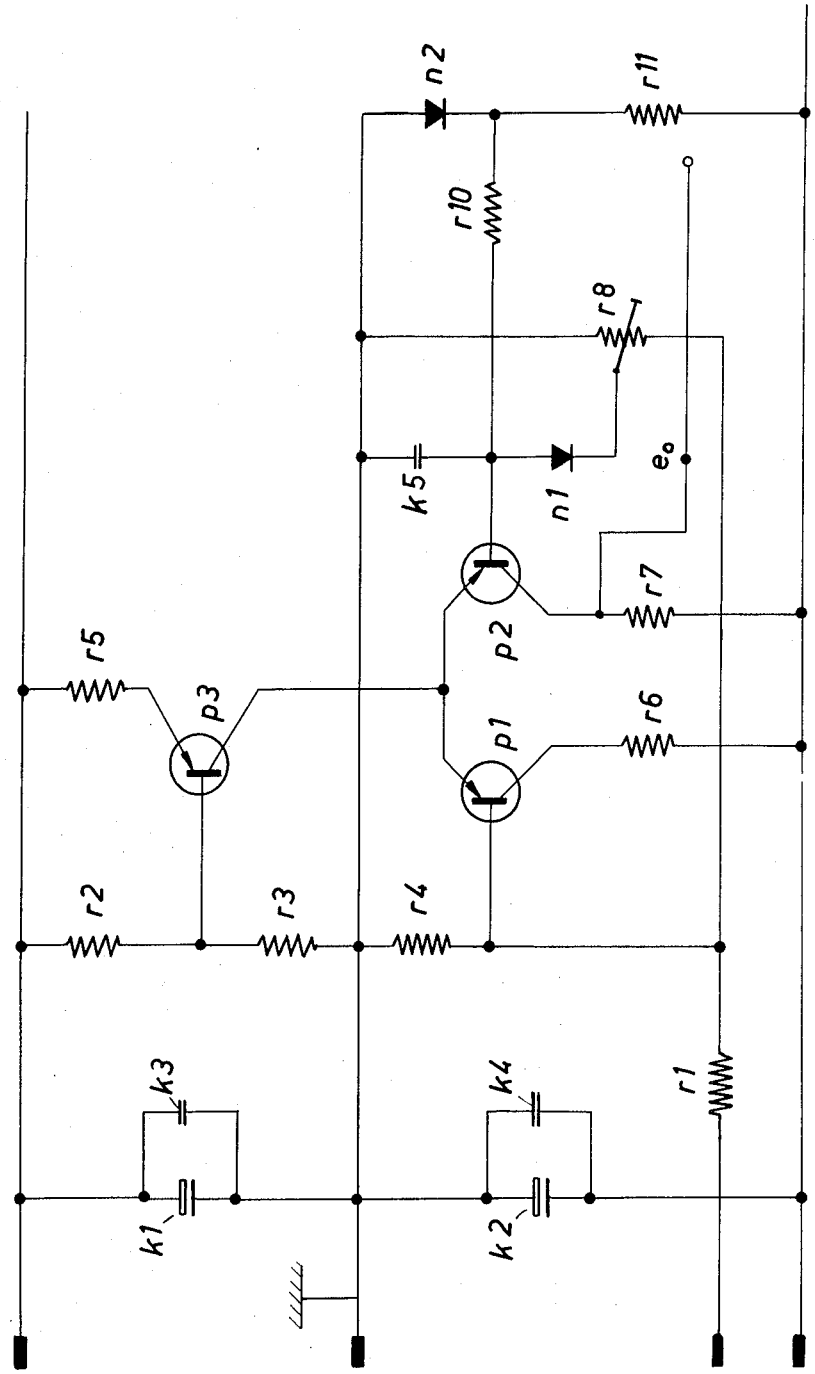
FIG. 5 shows a circuit diagram in which the differential amplifier of FIG. 2 is comprised of discrete electrical elements.

Instead of a differential amplifier in an integrated circuit such as shown in FIG. 2, it is quite possible to use discrete elements and transistors in a variety of configurations to accomplish the objects set forth above and one such arrangement is shown in FIG. 5. In the arrangement of FIG. 5, a differential amplifier suitable for use is formed of the transistors $p_1$ and $p_2$ with the resistors $r_2$, $r_3$, $r_5$ and the transistor $p_3$ forming a constant current source primarily to improve the in-phase rejection within the differential amplifier. The resistance $r_1$ serves as an input resistance for the input voltage to the differential amplifier to prevent damage resulting from high input voltages. The resistance $r_4$ is the base leakage resistance for the transistors $p_1$, while the resistances $r_6$ and $r_7$ serve as the operating resistances of transistors $p_1$ and $p_2$. The capacitor $k_5$ corresponds to the capacitor $k_9$ in FIG. 2 and performs a similar delaying and energy storing function. In this embodiment, the auxiliary direct current voltage is produced by means of a diode $n_2$ and resistance $r_{11}$, and the voltage across the resistance $r_{11}$ preferably corresponds to the source 12 shown in FIG. 2. The resistance $r_{10}$ is a discharge resistance for the capacitor $k_5$ and corresponds to the resistance 10 in FIG. 2 while the diode $n_1$ corresponds to diode 8. Both diodes have the task of preventing the capacitor from discharging via the voltage divider after charging, and both diodes consequently force various time constants for charging and discharging the capacitors via the correct resistive elements.

The above invention is then capable of quickly detecting a short circuit and switching off the energy supply and at the same time triggering a shunt device to divert current away from the gap and furthermore is substantially invulnerable against false alarms resulting from ordinary variations in the load current and voltage. While this invention is particularly useful in situations where a rapid collapse of the voltage is under way, as the beginning of a serious short circuit which will considerably damage the device, the present invention is also effective in situations of creeping short circuit where the voltages collapse slowly. In such a case the input voltage $e_1$, for example, in FIG. 2 disappears slowly while $e_2$ assumes the value of the auxiliary direct current. The output voltage then is not a positive impulse but a positive direct current voltage which also serves as a control signal to interrupt the current flow through the gap 2 and to effectively place the shunt elements 4 across the gap 2.

Many modifications and changes of the above invention will be clear to anyone of ordinary skill in the art and the invention is intended to be limited only by the scope of the appended claims.

What is claimed is:

1. Apparatus for detecting a short circuit condition across a gap comprising:
   means for producing a first electrical signal proportional to the voltage across said gap,
   means for producing a second electrical signal proportional to the voltage across said gap delayed in time including a circuit comprising a capacitor connected in parallel with a serially connected resistance and a source of direct current voltage and a diode connected in series with said circuit, and
   means for combining said first and second signals to produce a control signal which rises sharply indicating a short circuit condition across said gap whenever said voltage across said gap changes abruptly.

2. Apparatus as in claim 1 wherein said second signal producing means including means for reducing the amplitude of said first signal to produce a reduced signal and means for delaying in time said reduced signal and said combining means includes a differential amplifier having said first signal as a first input and said second signal as a second input.

3. Apparatus as in claim 2 wherein said reducing means includes a voltage divider for receiving said first signal and having its output connected to said diode.

4. Apparatus as in claim 3 wherein said differential amplifier is comprised of discrete elements.

5. Apparatus as in claim 3 wherein said differential amplifier is comprised of an integrated circuit.

References Cited

UNITED STATES PATENTS

| | | | |
|---|---|---|---|
| 2,564,829 | 8/1951 | Bedford et al. | 324—111 X |
| 3,091,738 | 5/1963 | Relis et al. | 328—132 X |
| 3,328,704 | 6/1967 | Wantland | 328—132 X |
| 3,517,321 | 6/1970 | Weiss | 328—132 X |
| 3,529,241 | 9/1970 | Bright | 324—111 |
| 3,130,371 | 4/1964 | Copeland | 328—135 X |
| 3,513,353 | 5/1970 | Lansch | 317—31 |
| 3,524,075 | 8/1970 | Matthews et al. | 328—135 X |
| 3,532,905 | 10/1970 | Zijta et al. | 328—135 X |
| 3,564,528 | 2/1971 | Drushel | 340—253 X |

GERARD R. STRECKER, Primary Examiner

U.S. Cl. X.R.

204—143; 317—31; 324—111; 328—135; 340—253